Figure 1:
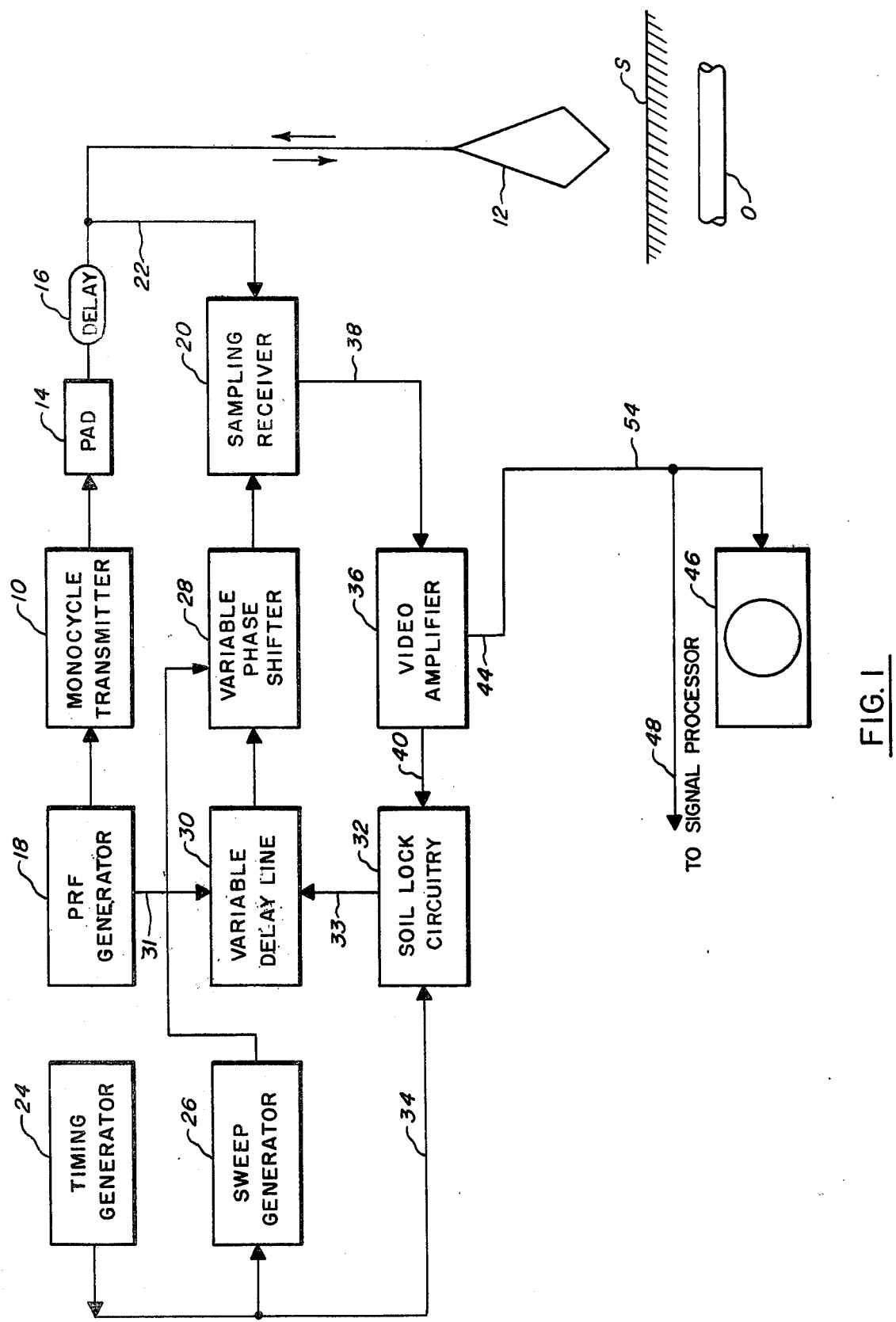

United States Patent [19]
Alongi

[11] 4,072,942
[45] Feb. 7, 1978

[54] APPARATUS FOR THE DETECTION OF BURIED OBJECTS

[75] Inventor: Anthony V. Alongi, Niagara Falls, N.Y.

[73] Assignee: Calspan Corporation, Buffalo, N.Y.

[21] Appl. No.: 741,312

[22] Filed: Nov. 11, 1976

Related U.S. Application Data

[63] Continuation of Ser. No. 659,883, Feb. 20, 1976, abandoned, which is a continuation of Ser. No. 504,571, Sept. 9, 1974, abandoned.

[51] Int. Cl.² ............................................. G01S 9/02
[52] U.S. Cl. .............................. 343/5 NA; 343/7.3
[58] Field of Search ................................ 343/5 NA

[56] References Cited

U.S. PATENT DOCUMENTS

| 3,392,384 | 7/1968 | Wesch | 343/5 NA |
| 3,967,282 | 6/1976 | Young et al. | 343/5 NA |

*Primary Examiner*—T.H. Tubbesing
*Attorney, Agent, or Firm*—Allen J. Jaffe; David J. Zobkiw

[57] ABSTRACT

Apparatus for the detection of buried objects comprising a broadband, high resolution short pulse transmitter and a bistatic or monostatic noncontacting antenna for radiating the transmitted signal through the ground for reflection from a buried object, a sampling type receiver which reduces the bandwidth and center frequency of the received signal, and a locking circuit controlled by the first reflection from the ground or soil surface to thereby lock the range sweep to the soil surface and eliminate the effects of antenna height variations.

18 Claims, 3 Drawing Figures

APPARATUS FOR THE DETECTION OF BURIED OBJECTS

This is a continuation of application Ser. No. 659,883, filed on Feb. 20, 1976 which is a continuation of Ser. No. 504,571, filed on Sept. 9, 1974 both of which are now abandoned.

BACKGROUND OF THE INVENTION

The present invention relates to an apparatus for the detection and resolution from above the surface of the earth buried metallic and nonmetallic objects hereinafter termed "targets".

Other radar-type systems have been suggested for locating and resolving buried targets as typified by U.S. Pat. No. 3,775,765. This patent discloses a system whereby buried targets are detected by the employment of an antenna assembly in contact with the ground and having an impedance approximately equal to that of the ground. A system of this type requires a coarse and fine impedance matching system in order to maximize the transmitter signal coupling into the soil, to minimize the unwanted soil surface reflection and then to maximize the signal return from buried objects. This is accomplished by employing a dielectric lens for coarse impedance matching and a variable matching network driven by a feedback loop for the fine impedance matching.

In contrast; the system of the present invention achieves similar objectives by means of the generation of a true short pulse for the transmitted signal and by means of range gating out the unwanted soil surface reflection. In other words, the system of the present invention does not require additional and complicated structure for matching the impedance of the soil under varying conditions but, rather, employs circuitry which has a high enough resolution capability to distinguish the strong soil reflections from the desired buried object reflections.

Figure 2:
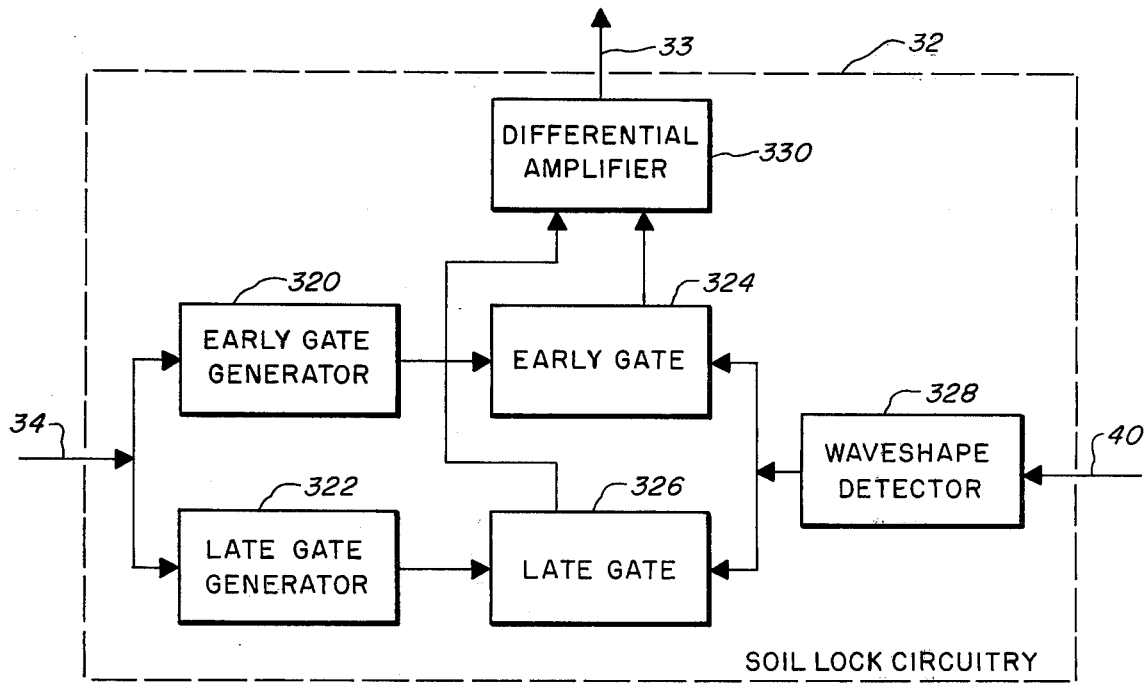
Figure 3:
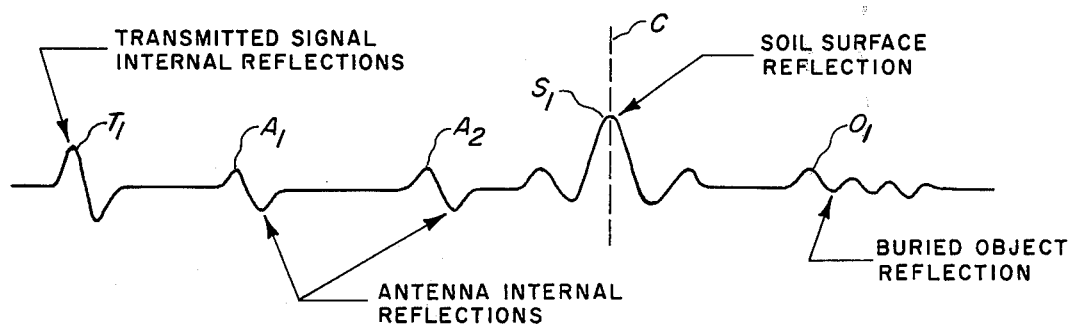

The above advantages of the present invention, as well as others, will become apparent as the following detailed description thereof proceeds when taken in conjunction with the accompanying drawings wherein:

FIG. 1 is a schematic block diagram of the system according to the present invention; and FIG. 2 is a schematic block diagram of the soil lock circuitry of FIG. 1 illustrating the well known components thereof; and FIG. 3 is an illustrative curve of reflected signal waveshapes.

Referring now to the drawings and, more particularly, to FIG. 1, the apparatus according to the present invention is illustrated as comprising a short pulse monocycle transmitter 10 0f well known construction for delivering a single cycle sine wave of short duration to a broadband nondispersive antenna 12 through an attenuating pad 14 and a delay line 16. The antenna 12 is located above the surface of the ground S below which is the buried object to be detected O, which is illustrated, for exemplary purposes only, as a nonmetallic pipe. Transmitter 10 is driven by a conventional PRF generator 18 at a relatively high rate, on the order of several megahertz, for example.

Antenna 12 may be either monostatic or bistatic and of a construction similar to that described in the article by Robert J. Wohlers entitled "The GWIA, An Extremely Wide Bandwidth Low Dispersion Antenna" and published in the Abstracts of the Twentieth Annual Symposium USAF Antenna Research and Development, Oct. 13, 14 and 15, 1970. Alternatively, other well known types of broadband low dispersion antennas may be employed.

The delay line 16 may comprise a low loss coaxial cable which is nondispersive or frequency independent.

A sampling-type receiver 20 receives signals from line 22 and reflected return signals from antenna 12. Receiver 20 is of conventional construction such as of the type employed in readily available sampling oscilloscopes. The reflected return signals in line 22 are of such high frequency that receiver 20 must be triggered to sample a portion of each reflected signal until a replica or composite of the reflected signal waveforms are generated. To this end, a timing generator 24, of conventional construction, is employed to trigger a sweep generator 26 which develops a low frequency ramp voltage of 100 Hertz, for example, which is applied to a variable phase shifter 28 of conventional construction as, for example, a voltage controlled varactor tuned phase shifter. The output signal of PRF generator 18 is also employed to trigger a fast strobe pulse in receiver 20 by being coupled via line 31 through a voltage tuned variable delay line 30, of conventional construction, the delay of which is controlled by the error signal from a soil lock circuit 32, via line 33 to be described in greater detail hereinbelow. The delayed PRF trigger signal is summed with the low frequency ramp signal derived from the sweep generator 26 in the variable phase shifter 28, the output of which controls the timing of the strobe pulse employed by the receiver 20. The sampling receiver 20 thereby samples the input waveform from antenna 12 with strobe pulses that are precisely varied in time in a linear fashion.

The voltage output of receiver 20 is proportional in amplitude to the input waveform received from antenna 12 at the instant of sampling initiated by the strobe pulse. The timing generator 24 also controls the actuation of soil lock circuit 32 via line 34 as will be discussed hereinbelow.

A video or audio frequency amplifier 36 receives the return signals from receiver 20 via line 38 and delivers the same to soil lock circuit 32 via line 40.

Referring now to FIG. 2, the soil lock circuitry 32 is depicted as comprising a conventional early gate generator 320 and a late gate generator 322 which respond to signals from the timing generator 24 to actuate, respectively, early gate 324 and late gate 326. The early gate 324 and the late gate 326 function, respectively, to accept the radar video signal obtained from the sampling receiver 20, video amplifier 36 and a wave shape detector 328 of conventional construction. The outputs of gates 324 and 326 are delivered to a differential amplifier 330 wherein the differences between these gates are detected and an error signal is developed in line 33 to control the variable delay line 30. As will be discussed hereinbelow the soil lock circuitry 32 functions to detect the center of the soil surface reflections and lock the timing of the receier 20 to this center such that video amplifier 36 delivers a signal via line 44 to an oscilloscope 46 and/or to a signal processor (not shown) via line 48 only when the center of the soil surface reflection is detected.

In FIG. 3 a schematic representation of an exemplary waveshape of the reflected signals in line 22 leading to receiver 20 is depicted. The first signal, with respect to time, will be the reflection of the transmitted signal $T_1$;

the second set of signals will be the reflection of the feed and end of the antenna ($A_1$, $A_2$); the third signal will, be the reflection from the soil surface $S_1$ and the last signal will be the reflection from the buried object or target $O_1$. As is apparent the only signal of interest is that reflected from the buried object or target, the characteristic shape of which will yield information relating to the target identity, approximate size and shape and depth below the soil surface. The reflected signals $T_1$, $A_1$, $A_2$ and $S_1$ are of no interest and should not normally be displayed on oscilloscope 46 nor transmitted to a signal processor via line 48. Soil surface signal $S_1$, however, is of significance in determining when the sampling process of the receiver 20 is actuated so that signals $T_1$, $A_1$ and $A_2$ are not wastefully passed through the system. To this end, soil lock circuit 32 functions to locate the signal $S_1$ and lock the sampling process of the receiver 20 to the position thereof in time. This not only eliminates the unwanted signals but also functions to stabilize the desired object or target signal regardless of motion of the antenna to various elevations above the soil surface. This feature is extremely significant for a portable mancarried system where the height of the antenna above the ground would always fluctuate.

The manner in which this is accomplished will now be described. It has been observed that of all the reflected signals, the soil surface reflection $S_1$ is symmetrical, with respect to time, about its cener C and occasionally the buried object reflection $O_1$ which is however much weaker than $S_1$. Thus early gate 324 functions to pass the first part of the signals emanating from waveshape detector 328 which accepts only the strong symmetrical signal such as $S_1$ and rejects weaker symmetrical signals such as $O_1$ and late gate 326 functions to pass the second part of such signals. Both parts of such signals are fed to differential amplifier 330 which compares each part and generates an error signal in line 33 if both parts are not equal in magnitude and sign. If there is no error signal then the center of the soil surface reflection has been located. If there is an error signal in line 33 the variable delay line 30 is altered to shift the timing of receiver 20 until the center of the soil surface reflection is detected. Thus, soil lock circuitry 32 continues to hunt and track the center of the symmetrical soil surface reflection. In other words, an error signal is derived by the differential amplifier 330 and is applied to variable delay line 30 to control the time delay of the pulse, from PRF generator 18, employed to develop a strobe pulse in receiver 20. The soil surface signal together with the object reflection signal is then passed through video amplifier 36, the output from which is delivered to the oscilloscope 46 and/or a suitable signal processor via line 48.

The object reflection signal can then be compared with the characteristic returns or signatures of known objects in order to make an identification thereof.

Although a preferred embodiment of the present invention has been illustrated and described, changes will occur to those skilled in the art. It is therefore intended that the present invention be limited only by the scope of the appended claims.

What is claimed is:

1. Apparatus for detecting objects buried below the surface of the earth, comprising:
    (a) transmitter means for generating short, monocycle pulses of signals,
    (b) antenna means spaced from and movable over said surface for radiating said signals to and receiving reflections from said surface, said reflections comprising a plurality of signals spaced in time each of which having a characteristic waveshape,
    (c) receiver means connected to said antenna means for generating an output signal in response to said reflections,
    (d) soil lock circuit means responsive to the receiver means output signal for detecting the center of a symmetrical waveshape comprised within said reflections which represents the signal reflected from the surface of the earth, said soil lock circuit means developing as an output an error signal, and
    (e) means for controlling said receiver means in response to said error signal.

2. The apparatus according to claim 1, further comprising:
    (f) means for indicating the waveshape of the signal comprised within said reflections that follows said symmetrical waveshape, which represents the signal reflected from the object below the surface of the earth.

3. The apparatus according to claim 2, wherein said means for indicating comprises a display.

4. The apparatus according to claim 2, wherein said means for controlling said receiver means in response to said error signal comprises a variable delay line.

5. The apparatus according to claim 4, wherein said receiver means comprises a sampling-type receiver and there is further provided;
    (g) a sweep generator developing a low frequency ramp voltage as an output, and
    (h) a variable phase shifter responsive to said output of said sweep generator.

6. The apparatus according to claim 5, wherein said error signal is delivered to said variable delay line for controlling said sampling receiver.

7. The apparatus according to claim 6, further comprising:
    (i) a PRF generator for delivering trigger signals to said transmitter means and said variable delay line.

8. The apparatus according to claim 7, further comprising;
    (j) a pad and delay line connected between said antenna means and said transmitter means.

9. The apparatus according to claim 8, further comprising:
    (k) a video amplifier between said sampling receiver and said soil lock circuit means.

10. The apparatus according to claim 9, wherein said soil lock circuit means comprises:
    (l) a waveshape detector responsive to an output signal from said video amplifier,
    (m) a differential amplifier for delivering said error signal to said variable delay line,
    (n) an early gate between said differential amplifier and said waveshape detector, and
    (o) a late gate between said differential amplifier and said waveshape detector.

11. The apparatus according to claim 1, wherein said means for controlling said receiver means in response to said error signal comprises a variable delay line.

12. The apparatus according to claim 11, wherein said soil lock circuit means comprises;
    (f) a waveshape detector responsive to an output signal from said receiver means,
    (g) a differential amplifier for delivering said error signal to said variable delay line, (h) an early gate between said differential amplifier and said waveshape detector, and (i) a late gate between said differential amplifier and said waveshape detector.

13. The apparatus according to claim 12, further comprising;

(j) a video amplifier between said receiver means and said waveshape detector.

14. The apparatus according to claim 13, further comprising;

(k) means for indicating the waveshape of the signal comprised within said reflections that follows said symmetrical waveshape, which represents the signal reflected from the object below the surface of the earth.

15. The apparatus according to claim 12, wherein said antenna means comprises a nondispersive monostatic antenna.

16. The apparatus according to claim 12, wherein said antenna means comprises a nondispersive bistatic antenna.

17. The apparatus according to claim 1, wherein said antenna means comprises a nondispersive monostatic antenna.

18. The apparatus according to claim 1, wherein said antenna means comprises a nondispersive bistatic antenna.

* * * * *